United States Patent
Shindoh

(10) Patent No.: US 7,210,884 B2
(45) Date of Patent: May 1, 2007

(54) FASTENING COMPONENT AND APPLIANCE

(75) Inventor: Yoshio Shindoh, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/046,784

(22) Filed: Feb. 1, 2005

(65) Prior Publication Data
US 2005/0286992 A1    Dec. 29, 2005

(30) Foreign Application Priority Data
Jun. 28, 2004    (JP)    ............... 2004-189768

(51) Int. Cl.
*F16B 37/04*    (2006.01)

(52) U.S. Cl. ............... 411/82.5; 411/DIG. 2; 403/28

(58) Field of Classification Search ............... 411/82.5, 411/DIG. 2, 909; 403/28, 30
See application file for complete search history.

(56) References Cited

U.S. PATENT DOCUMENTS

| | | | | |
|---|---|---|---|---|
| 3,416,823 A | * | 12/1968 | Auer | 403/408.1 |
| 4,450,616 A | * | 5/1984 | Morita | 29/446 |
| 5,395,193 A | * | 3/1995 | Krumme et al. | 411/339 |
| 5,578,034 A | * | 11/1996 | Estes | 606/61 |
| 6,646,240 B2 | * | 11/2003 | Jarvis | 219/635 |
| 6,688,828 B1 | * | 2/2004 | Post | 411/383 |
| 2004/0247386 A1 | * | 12/2004 | Sugiyama et al. | 403/408.1 |

FOREIGN PATENT DOCUMENTS

| | | |
|---|---|---|
| JP | S62-110013 | 5/1987 |
| JP | U-H02-36616 | 3/1990 |
| JP | U-H04-113320 | 10/1992 |
| JP | H-07-004407 | 1/1995 |
| JP | 2002-005124 | 1/2002 |
| JP | 2004-316781 A * | 11/2004 |
| WO | WO-91/05173 | 4/1991 |

* cited by examiner

*Primary Examiner*—Flemming Saether
(74) *Attorney, Agent, or Firm*—Birch, Stewart, Kolasch & Birch, LLP

(57) ABSTRACT

There is provided a fastening component and an appliance having a fastening structure, in which the appliance can be readily disassembled without detaching the fastening component from a structural body. The fastening component is constituted of a head disposed at an end of a shaft, a washer disposed at an end portion of the shaft, and made of a shape-memory member being contractible in a radial direction with the application of heat, and a washer holder formed around an outer circumference of the shaft. The washer holder includes a washer container having a diameter smaller than an inner diameter of the washer when contracted due to application of heat, and a washer locker formed adjacently to the washer container at an end of the washer container opposite to the head and having a diameter greater than the inner diameter of the washer when contracted due to the application of heat.

8 Claims, 15 Drawing Sheets

Fig.3
(a)
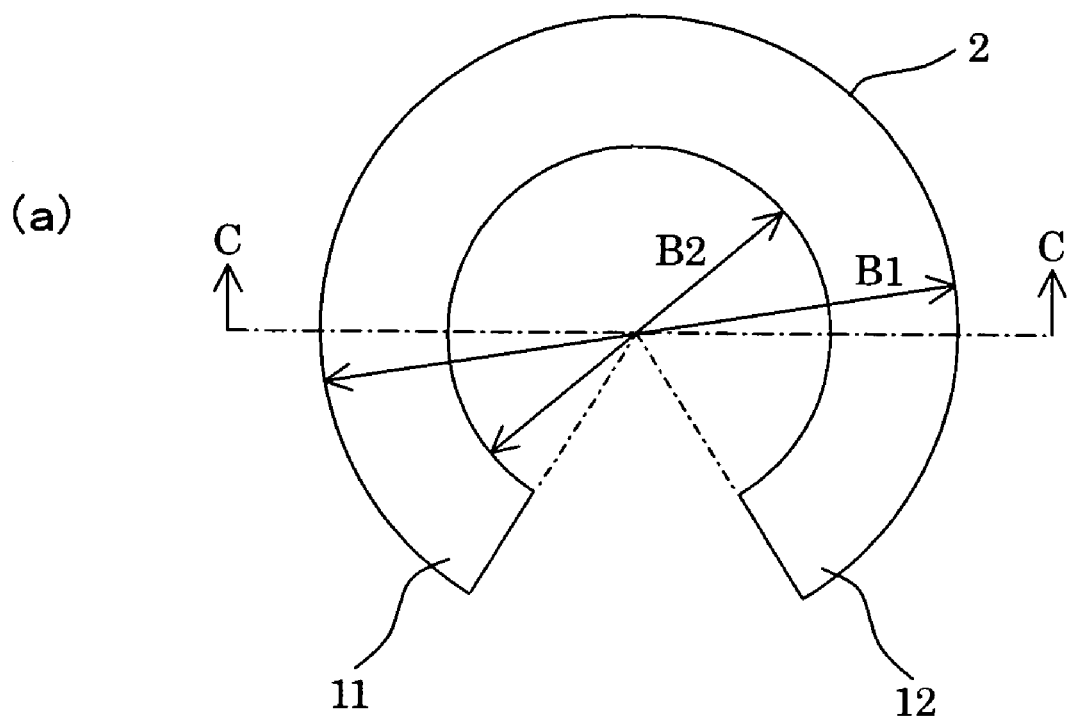
(b)
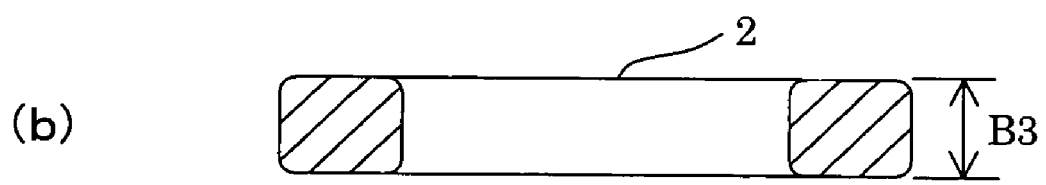

Fig.8
(a)
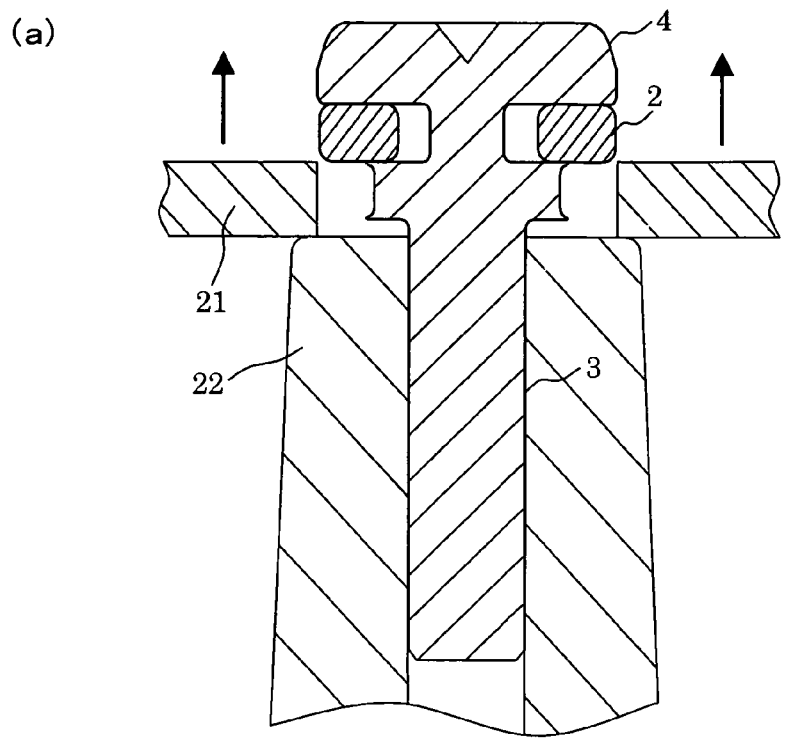
(b)
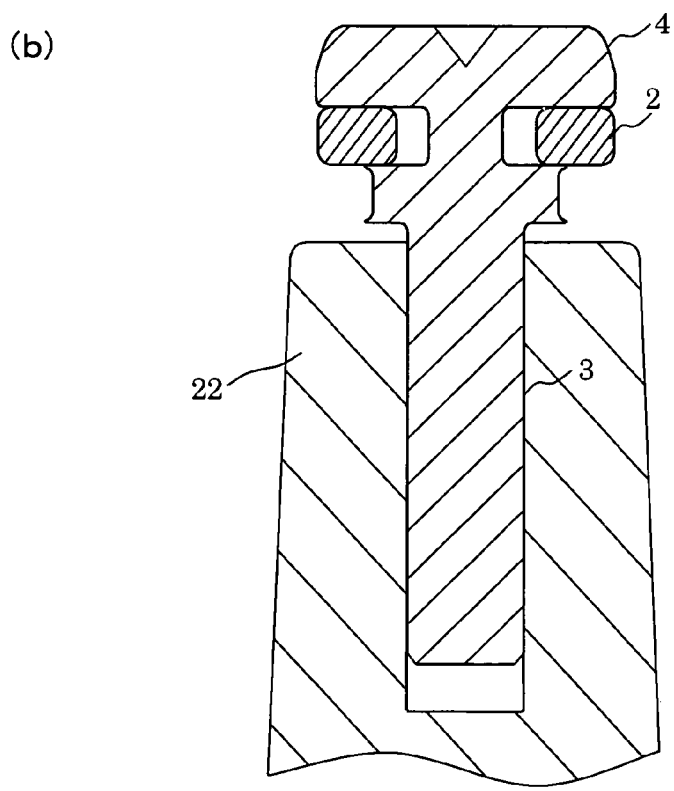

Fig.14
(a)
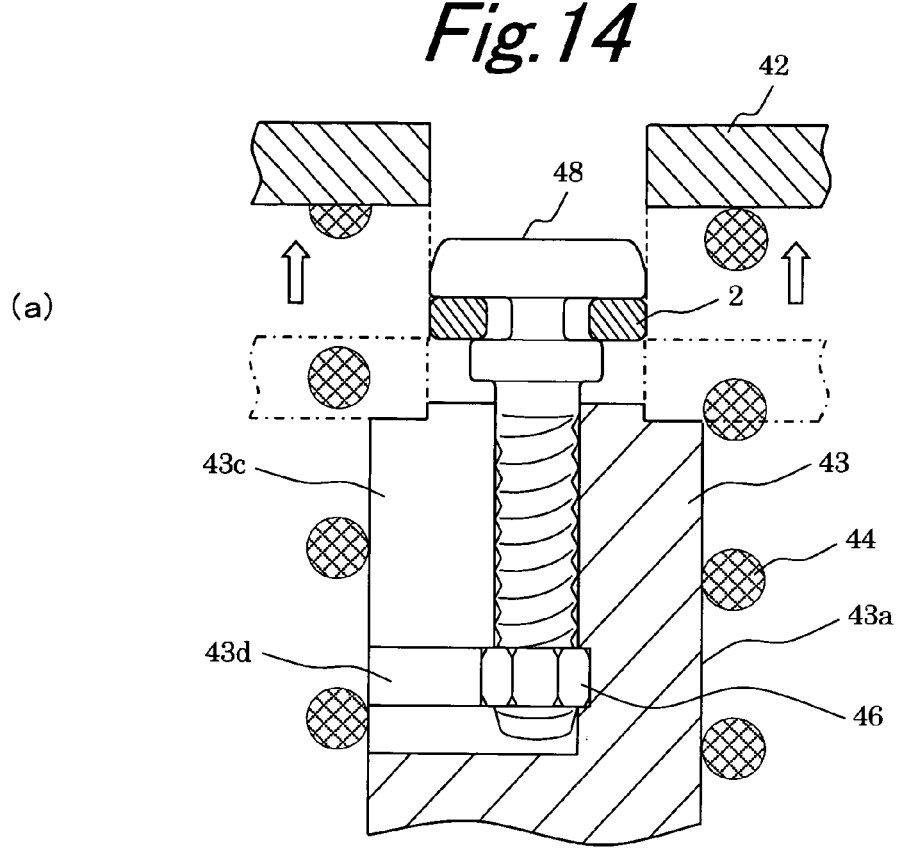
(b)
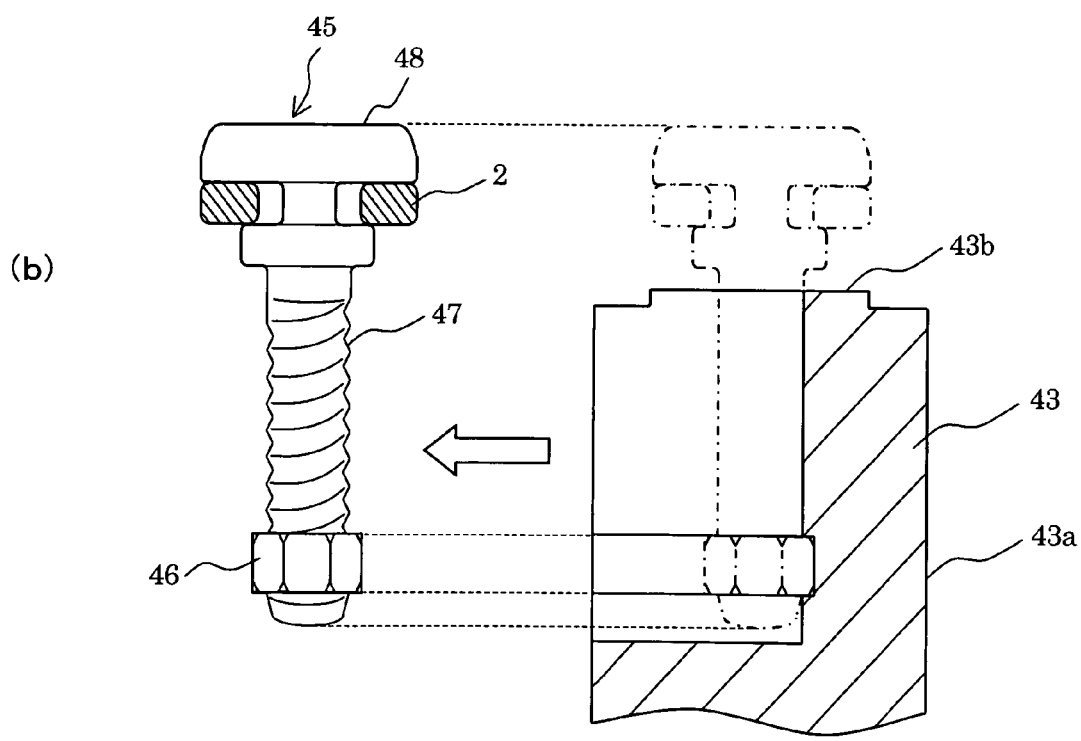

FASTENING COMPONENT AND APPLIANCE

BACKGROUND OF THE INVENTION

1. Field of the Invention

The present invention relates to a fastening component and an appliance having a fastening structure and, more particularly, to an improvement of a fastening component including a shaft, a head disposed at an end of the shaft and a washer arranged at the end of the shaft. In particular, the present invention relates to a fastening component, in which an appliance having a fastening structure can be readily disassembled by using a washer made of a shape-memory member contractible in a radial direction with the application of heat.

2. Description of the Related Art

In recent years, air conditioners, washing machines, refrigerators, television sets and other electric appliances have aggressively taken the technique in improving the recyclability of appliances from the viewpoint of effective use of resources and consideration to the environment. In other words, the appliance is disassembled, and then, various structural bodies constituting the appliance are recycled. Specifically, there has been proposed a technique relating to an appliance having a fastening structure for fastening various structural bodies to each other by the use of fastening components such as a screw, a bolt and a rivet, the appliance being readily disassembled (for example, JP-U 02-36616 (1990) and JP-A 07-4407 (1995)).

JP-U 02-36616 (1990) discloses a washer made of a shape-memory alloy which is contracted in a screw axial direction with the application of heat. With such a washer, a screw fitted to a structural body is loosened by heating the washer, thereby facilitating detachment of the screw. However, there has remained a problem of complete detachment of the screw from the structural body when the appliance is disassembled.

In contrast, JP-A 07-4407 (1995) discloses a screw made of a shape-memory member, in which a tip of a shaft having a thread is bisected. Such a screw disclosed in JP-A 07-4407 (1995) uses no washer, although the screw can be readily detached from the structural body when the appliance is disassembled.

Otherwise, JP-U 04-113320 (1992) discloses a washer, in which a cutout is partly formed in an annular shape-memory alloy in such a manner that the cutout is enlarged in a lateral direction with the application of heat. With such a washer, the washer can be readily detached since the cutout is enlarged in the lateral direction with the application of the heat. However, an appliance cannot be readily disassembled.

Alternatively, JP-A 62-110013 (1987) discloses a spring washer made of a shape-memory alloy capable of suppressing degradation of a looseness stopping function due to thermal expansion. With such a spring washer, the degradation of the looseness stopping function of a screw can be suppressed, but an appliance cannot be readily disassembled.

As described above, there has remained yet the problem of the complete detachment of the fastening component from the structural body in disassembling the appliance in the conventional fastening components.

SUMMARY OF THE INVENTION

The present invention has been accomplished to solve the above-described problem. Therefore, an object of the present invention is to provide a fastening component and an appliance having a fastening structure, in which the appliance can be readily disassembled without detaching the fastening component from a structural body. Furthermore, another object of the present invention is to provide a fastening component, in which a washer can be prevented from being lost when an appliance is disassembled.

A fastening component according to the present invention comprises: a head disposed at an end of a shaft and having a diameter greater than that at the end of the shaft; a washer disposed at the end of the shaft, the washer being made of a shape-memory member having an outer diameter before heating greater than the diameter of the head and being contractible in a radial direction with the application of heat; and a washer holder formed along a circumferential direction on a circumference at the end of the shaft, for holding the washer contracted in the radial direction with the application of the heat.

With the above-described configuration, since the washer is made of the shape-memory member contractible in the radial direction with the application of the heat, the washer can be contracted in the radial direction, as necessary, by heating the washer. At this time, the washer holder for holding the washer contracted in the radial direction with the application of the heat is disposed in the shaft, so that the washer contracted with the application of the heat can be prevented from being detached from the shaft and scattered.

In particular, the fastening component according to the present invention is configured such that the washer holder includes: a washer container having a diameter smaller than an inner diameter of the washer at the time of contraction; and a washer locker formed adjacently to the washer container on a side opposite to the head and having a diameter greater than the inner diameter of the washer at the time of the contraction. With the above-described configuration, the washer locker having the diameter greater than the inner diameter of the washer at the time of the contraction is formed adjacently to the washer container on the side opposite to the head, thereby inhibiting the washer contracted in the radial direction with the application of the heat from being moved from the washer holder toward the other end of the shaft.

In addition to the above-described configuration, the fastening component according to the present invention is configured such that the washer locker coaxially holds the washer on the circumference at the time of not-fastening; in contrast, the washer is moved toward the washer container by pressing force in an axial direction at the time of fastening. With the above-described configuration, the washer is coaxially held on the circumference of the washer locker at the time of the not-fastening, thereby readily positioning the washer at the time of the fastening.

In addition to the above-described configuration, the fastening component according to the present invention is configured such that the washer locker has a diameter greater than that at the other end beyond the washer locker in the shaft, and includes protrusions formed along a circumferential direction on a side opposite to the washer container on the circumference, so as to protrude in the radial direction. With the above-described configuration, since the contact of the washer with the protrusions can inhibit any movement in the axial direction, it is possible to effectively prevent the washer from falling from the washer locker toward the other end of the shaft at the time of the not-fastening and from being detached from the shaft.

In addition to the above-described configuration, the fastening component according to the present invention is configured such that the washer locker includes projections formed on the side of the washer container on the circumference, so as to project in the radial direction. With the above-described configuration, since the contact of the washer with the projections can inhibit any movement in the axial direction, it is possible to effectively prevent the washer from falling from the washer locker toward the washer container before the washer and the shaft are positioned at the time of the fastening.

In addition to the above-described configuration, the fastening component according to the present invention is configured such that the washer is cut out of a spiral wire rod which stores its shape therein. With the above-described configuration, since the washer is cut out of the spiral wire rod which stores its shape therein, the washer contractible in the radial direction with the application of the heat can be readily produced.

Furthermore, an appliance having a fastening structure according to the present invention comprises: a fastening component; and first and second structural bodies, which are fastened to each other via the fastening component, wherein the fastening component includes a shaft, a head disposed at an end of the shaft and having a diameter greater than that of the shaft, and a washer disposed at the end of the shaft and made of a shape-memory member having an outer diameter before heating greater than the diameter of the head and contractible in a radial direction with the application of heat, the first structural body includes a through hole having a diameter greater than that of the head and smaller than an outer diameter of the washer at the time of non-contraction, and the through hole has the diameter greater than the outer diameter of the washer at the time of contraction, the washer being pressed against the periphery of the through hole by the head when the fastening component is fixed to the second structural body via the through hole.

With the above-described configuration, since the washer of the fastening component is made of the shape-memory member contractible in the radial direction with the application of the heat, the washer can be contracted in the radial direction, as necessary, by heating the washer. At this time, since the diameter of the through hole formed at the first structural body is greater than the outer diameter of the washer at the time of the contraction, the washer contracted with the application of the heat can pass through the through hole. Consequently, the first structural body can be readily detached from the second structural body by heating the washer.

With the fastening component and the appliance having the fastening structure according to the present invention, the washer can be contracted in the radial direction, as necessary, by heating the washer. At this time, the washer holder for holding the washer contracted in the radial direction with the application of the heat is disposed in the shaft, so that the washer contracted with the application of the heat can be prevented from being detached from the shaft and being scattered.

Moreover, the through hole formed at the first structural body has the diameter greater than the outer diameter of the washer at the time of the contraction, so that the washer contracted with the application of the heat can pass through the through hole. In other words, if the washer of the fastening component is heated, as necessary, the first structural body can be readily detached from the second structural body. As a consequence, the appliance can be readily disassembled without detaching the fastening component from the structural body. Additionally, it is possible to inhibit the washer contracted with the application of the heat from being detached from the shaft, thus preventing any loss of the washer at the time of the disassembly of the appliance.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIGS. 3A and 3B are views showing one example of the detailed main portions in the fastening component shown in FIG. 1;

FIG. 8A is a cross-sectional view showing the detailed main portions in the appliance shown in FIG. 7;

FIG. 8B is a cross-sectional view showing the detailed main portions in the appliance shown in FIG. 7;

FIG. 14A is a state transition view showing one example of operation when the appliance shown in FIG. 12 is disassembled;

FIG. 14B is a state transition view showing one example of operation when the appliance shown in FIG. 12 is disassembled.

DESCRIPTION OF THE PREFERRED EMBODIMENTS

First Embodiment

Figure 1:
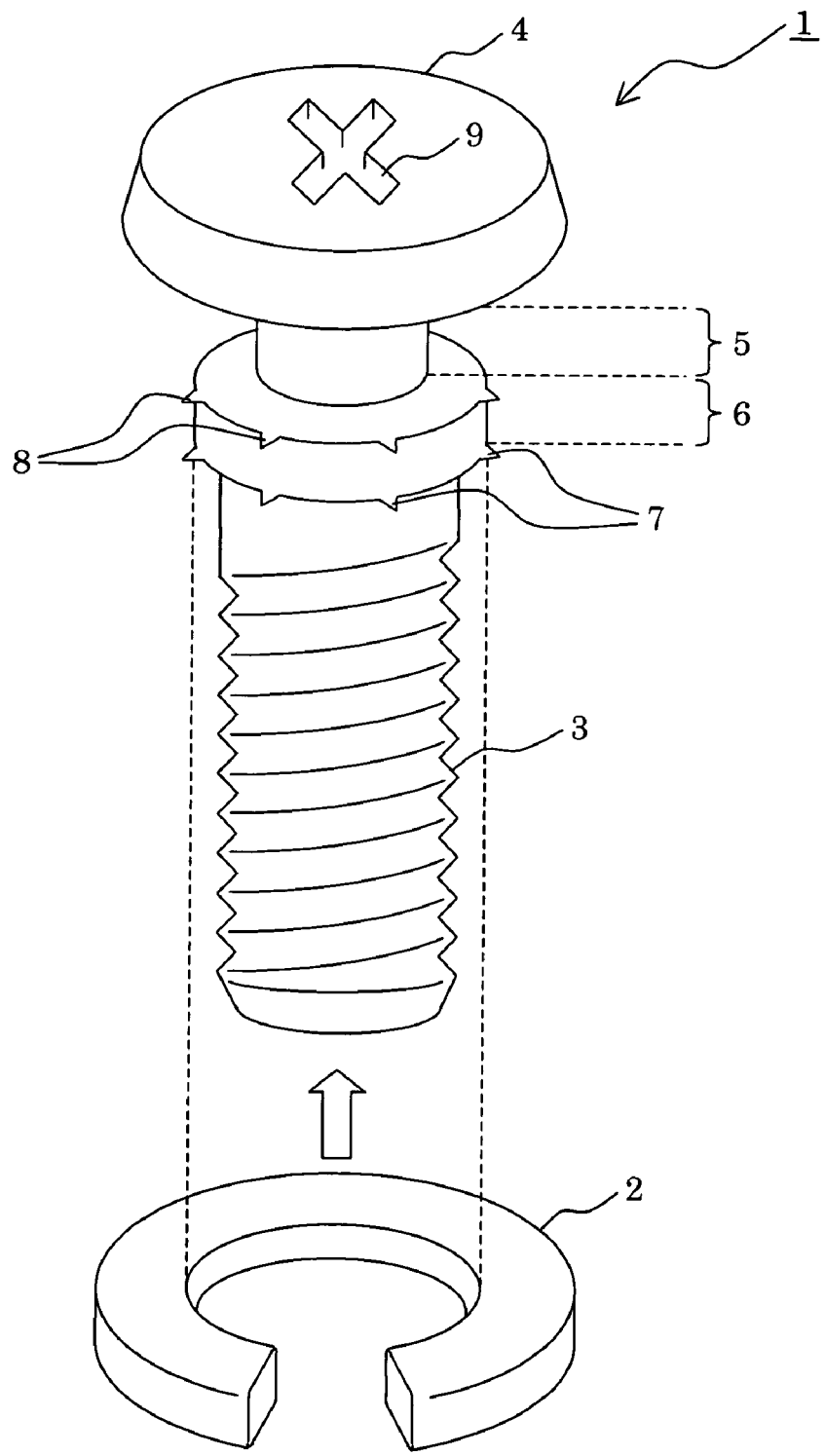
FIG. 1 is an exploded perspective view showing one example of a schematic configuration of a fastening component in a first embodiment according to the present invention.

FIG. 1 is an exploded perspective view showing one example of a schematic configuration of a fastening component in a first embodiment according to the present invention. There are shown a screw 1 serving as a fastening component main body, and a washer 2 made of a shape-memory member contractible in a radial direction with the application of heat. In the fastening component in this embodiment, workability at the time of disassembly of an appliance having a fastening structure is enhanced by using the washer 2 made of the shape-memory member contractible in the radial direction with the application of the heat.

The screw 1 includes a columnar shaft 3, a head 4 disposed at an end of the shaft 3, and a washer holder disposed at the end of the shaft 3.

The head 4 is formed of a disk-like member having a diameter greater than that at the end in the shaft 3, and is arranged coaxially with the shaft 3. A cross-shaped fitting hole 9, to which a head of a screwdriver is fitted, is formed at a surface on a side opposite to the shaft 3 in the head 4. That is to say, the head 4 serves as a screw head of the fastening component main body.

The washer holder includes a washer container 5 having a diameter smaller than an inner diameter of the washer 2 at the time of contraction, and a washer locker 6 formed adjacently to the washer container 5 on a side opposite to the head 4 and having a diameter greater than the inner diameter of the washer 2 at the time of the contraction.

In other words, the washer 2 contracted in the radial direction with the application of the heat is contained in the washer container 5 between the head 4 and the washer locker 6; therefore, the washer 2 is held in such a manner as not to be detached from the screw 1.

Herein, the diameter of the washer locker 6 is designed to be equal to the inner diameter of the washer 2 at the time of non-contraction. Incidentally, the diameter of the washer locker 6 is designed to be greater than that at the other end of the washer locker 6 in the shaft 3, that is, on the side opposite to head 4. Furthermore, the diameter of the washer container 5 is designed to be smaller than that at the other end of the shaft 3.

The washer locker 6 is adapted to coaxially hold the washer 2 on a circumference at the time of not-fastening while to move the washer 2 toward the washer container 5 by an axially pressing force at the time of fastening. At the washer locker 6 are formed protrusions 7 along a circumferential direction and on a side opposite to the washer container 5 on the circumference.

The plurality of protrusions 7 are formed in such a manner as to protrude in the radial direction, thereby serving as stoppers for preventing the washer 2 from falling out. Since the contact of the washer 2 with the protrusions 7 inhibits any axial movement, it is possible to prevent the washer 2 from falling from the washer locker 6 at the time of not-fastening, and then, to prevent the washer 2 from being detached from the shaft 3. At this time, the washer 2 is coaxially held on the circumference of the washer locker 6, thereby readily positioning the washer 2 at the time of the fastening.

Furthermore, at the washer locker 6 are formed projections 8 on the circumference on the side of the washer container 5. The plurality of projections 8 are formed in such a manner as to project in the radial direction, thereby serving as stoppers for preventing the washer 2 from falling out. Since the contact of the washer 2 with the projections 8 inhibits any axial movement, it is possible to effectively prevent the washer 2 from falling from the washer locker 6 toward the washer container 5 at the time of the fastening before the washer 2 and the shaft 3 are positioned. Herein, the protrusions 7 and the projections 8 are formed at positions facing to each other at equal intervals on the entire circumference.

The washer 2 is formed of an annular member disposed at an end of the shaft 3, that is, on the side of the head 4, and further, is used as a spacer. The washer 2 is made of a shape-memory member, which has an outer diameter before the application of heat greater than a diameter of the head 4 and is contractible in the radial direction with the application of the heat. Examples of the shape-memory member used as the washer 2 include shape-memory alloys made of various kinds of metals and shape-memory resins made of various kinds of polymers.

The shape-memory alloy is a metal which stores therein a shape molded at a predetermined phase transition temperature or higher at temperatures lower than the phase transition temperature and has a restoring function to the stored shape with the application of the heat. Specifically, a Ti-Ni (titanium-nickel) alloy, a Cu-Zn-Al (copper-zinc-aluminum) alloy, a Ti-Ni-Fe (titanium-nickel-iron) alloy and the like are used as the shape-memory alloy. The aforementioned shape-memory alloy is generally equipped with a super elasticity, a high vibration absorbability and a high corrosion resistance in addition to the restoring function with the application of the heat.

Conditions of heat treatment for storing a desired shape in the shape-memory alloy depend upon an alloy composition and usage. The alloy is heated for 5 minutes to 60 minutes, for example, in the ambient containing inactive gas, like in the atmosphere, or in a vacuum, while holding treatment temperatures from 400° C. to 800° C. Herein, the shape-memory alloy made of the Ti-Ni alloy is used as the shape-memory member, followed by the heat treatment for 10 minutes while holding a treatment temperature of 750° C. in the atmosphere.

The phase transition temperature (i.e., a reverse transformation starting temperature), at which the phase transformation of the shape-memory alloy is started with the application of the heat and the shape is restored to the stored shape, markedly depends upon the kinds or composition ratio of metallic elements constituting the alloy. For example, the phase transition temperature is 78° C. in the case of a Ti-50Ni alloy. The phase transition temperature is about 100° C. in the case of the Ti-Ni alloy used herein. Incidentally, the phase transformation with the application of the heat signifies a transformation from a martensite phase to an austenite phase.

In other words, even if the shape-memory alloy, which stores its shape at a high temperature, is deformed into a shape different from the stored shape at a low temperature, that is, at a temperature lower than the reverse transformation starting temperature, the stored shape can be restored with the application of the heat up to a temperature higher than the reverse transformation starting temperature. In view of this, a shape has been previously stored in a spiral wire rod, from which an annular member has been cut, and then, the washer 2 is obtained by increasing the diameter of the annular member. Thus, it is possible to provide the washer 2 contractible in the radial direction with the application of the heat.

In place of the use of the above-described shape-memory alloy as the shape-memory member, the shape-memory resin may be used. The shape-memory resin is a high molecular polymer which stores therein, at a temperature lower than the phase transition temperature, a shape molded at a predetermined phase transition temperature (i.e., a glass transition temperature) or higher and has a restoring function to the stored shape with the application of the heat. Specifically, a polyurethane-based polymer may be used as the shape-memory member.

Figure 2:
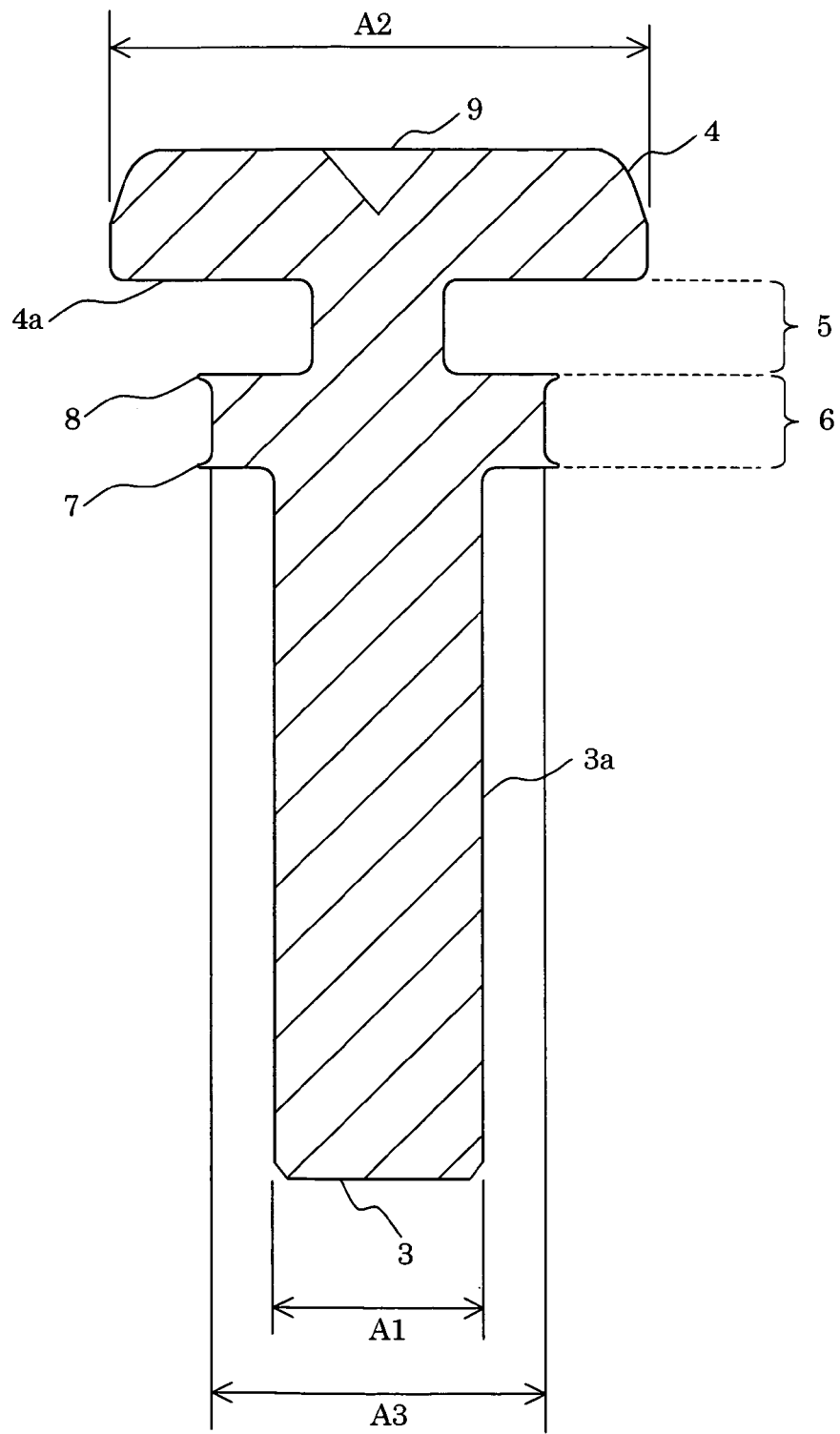
FIG. 2 is a view showing one example of detailed main portions in the fastening component shown in FIG. 1, and more particularly, a cross-sectional view showing a screw 1 cut on a plane in parallel to an axial direction.

FIG. 2 is a view showing one example of detailed main portions in the fastening component shown in FIG. 1, and more particularly, a cross-sectional view showing the screw 1 cut on a plane in parallel to an axial direction. A seat (i.e., a portion in contact with the washer 2 at the time of the fastening) 4a of the head 4 is perpendicular to the axial direction. At the other end of the shaft 3 (i.e., on the side opposite to the head 4) is formed a screw groove 3a serving as a male screw.

The axial length of each of the washer container 5 and the washer locker 6 is designed to be equal to the thickness of the washer 2. A diameter A3 of the washer locker 6 is the same as an inner diameter of the washer 2. Herein, the diameter A3 is smaller than a diameter A2 of the head 4 and greater than a diameter A1 at the tip of the shaft 3.

FIGS. 3A and 3B are views showing one example of the detailed main portions in the fastening component shown in FIG. 1; wherein FIG. 3A is a plan view showing the washer 2 before contraction with the application of the heat, and FIG. 3B is a cross-sectional view, taken along a line C—C in FIG. 3A. The washer 2 is obtained by cutting out the spiral wire rod, and further, has a radial cutout at a portion of the annular member. Namely, the cutout provides the annular member with a pair of arms 11 and 12, which face to each other.

The cross-sectional shape of the wire rod constituting the washer 2 is a rounded rectangle which is long in a lateral direction. In other words, a thickness (i.e., the length in a center axial direction) B3 of the washer 2 is smaller than a radial length. Moreover, an outer diameter B1 of the washer 2 is greater than the diameter A2 of the head 4 of the screw 1; in contrast, an inner diameter B2 is the same as the diameter of the washer locker 6.

Figure 4:
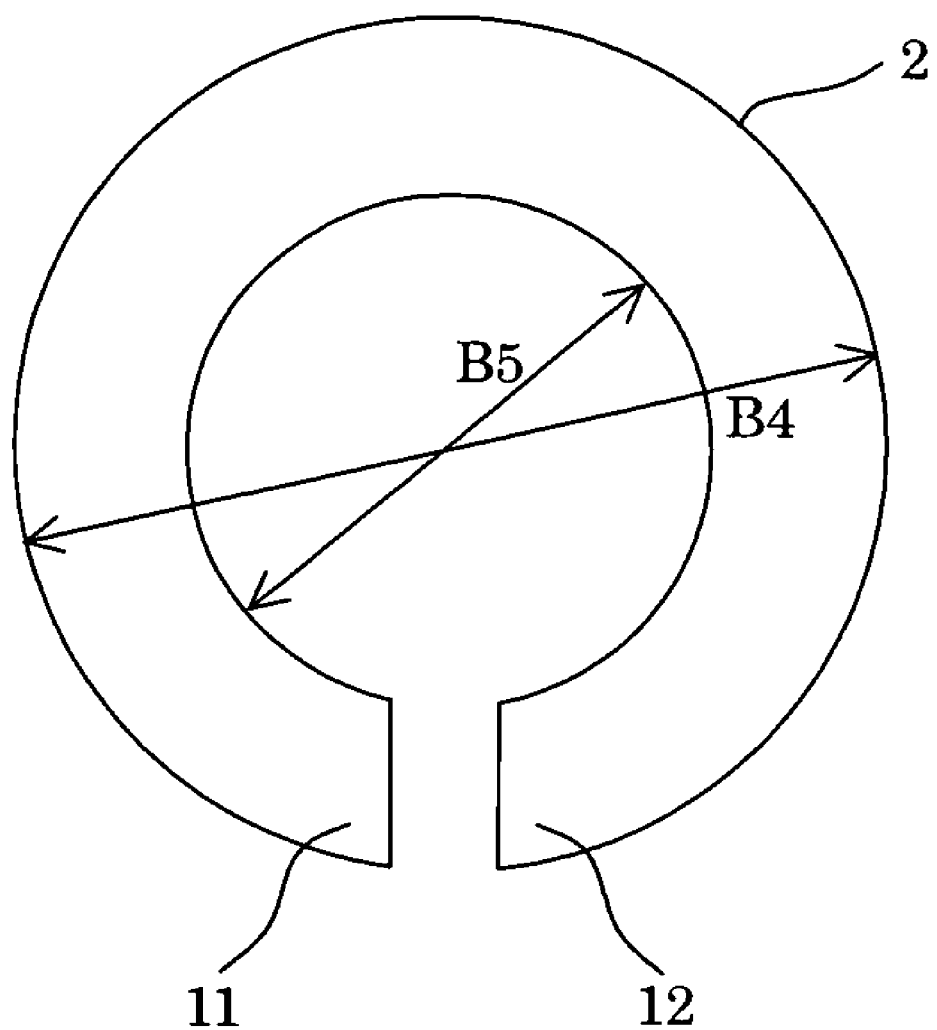
FIG. 4 is a plan view showing a washer shown in FIGS. 3A and 3B in a state where the washer is contracted with the application of heat.

FIG. 4 is a plan view showing the washer shown in FIGS. 3A and 3B in the state where the washer is contracted with the application of the heat. The washer 2 is used within the range of the temperatures to be normally used in the state where the arms 11 and 12 are separated from each other in the lateral direction; in contrast, the washer 2 is heated up to the temperature higher than the reverse transformation starting temperature in excess of the above-described temperature range when the washer 2 is intended to be contracted in the radial direction. The application of the heat enables the washer 2 to be contracted in the radial direction, as necessary. The arms 11 and 12 approach each other at the time of the contraction with the application of the heat. Naturally, an outer diameter B4 and an inner diameter B5 of the washer 2 at the time of the contraction become smaller than the outer diameter B1 and the inner diameter B2 at the time of the non-contraction, respectively (i.e., B4<B1 and B5<B2).

Specifically, the outer diameter B1 and the inner diameter B2 of the washer 2 at the time of the non-contraction are 7 mm and 4.3 mm, respectively; in contrast, the outer diameter B4 and the inner diameter B5 of the washer 2 at the time of the contraction are 5.5 mm and 2.8 mm, respectively.

Figure 5:
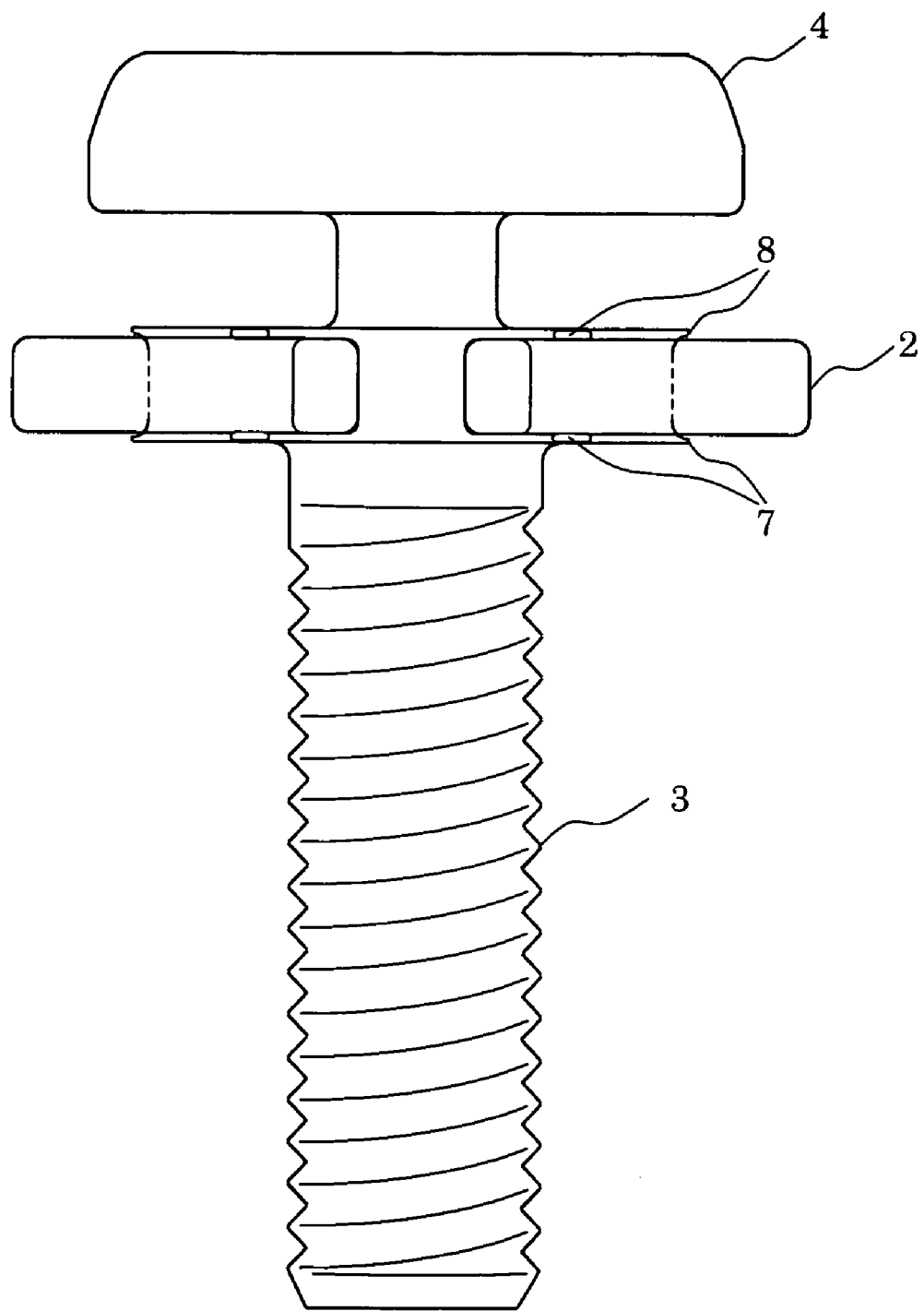
FIG. 5 is a view showing one example of a washer holding state in the fastening component shown in FIG. 1, and more particularly, illustrating a side state as viewed in a direction perpendicular to an axial direction.

FIG. 5 is a view showing one example of a washer holding state in the fastening component shown in FIG. 1, and more particularly, illustrating a side state as viewed in the direction perpendicular to the axial direction. At the time of the not-fastening, the washer 2 is held on the circumference of the washer locker 6 (i.e., the washer holding state). The washer remains held at the time of non-use, for example, at the time of shipment of a product.

Figure 6:
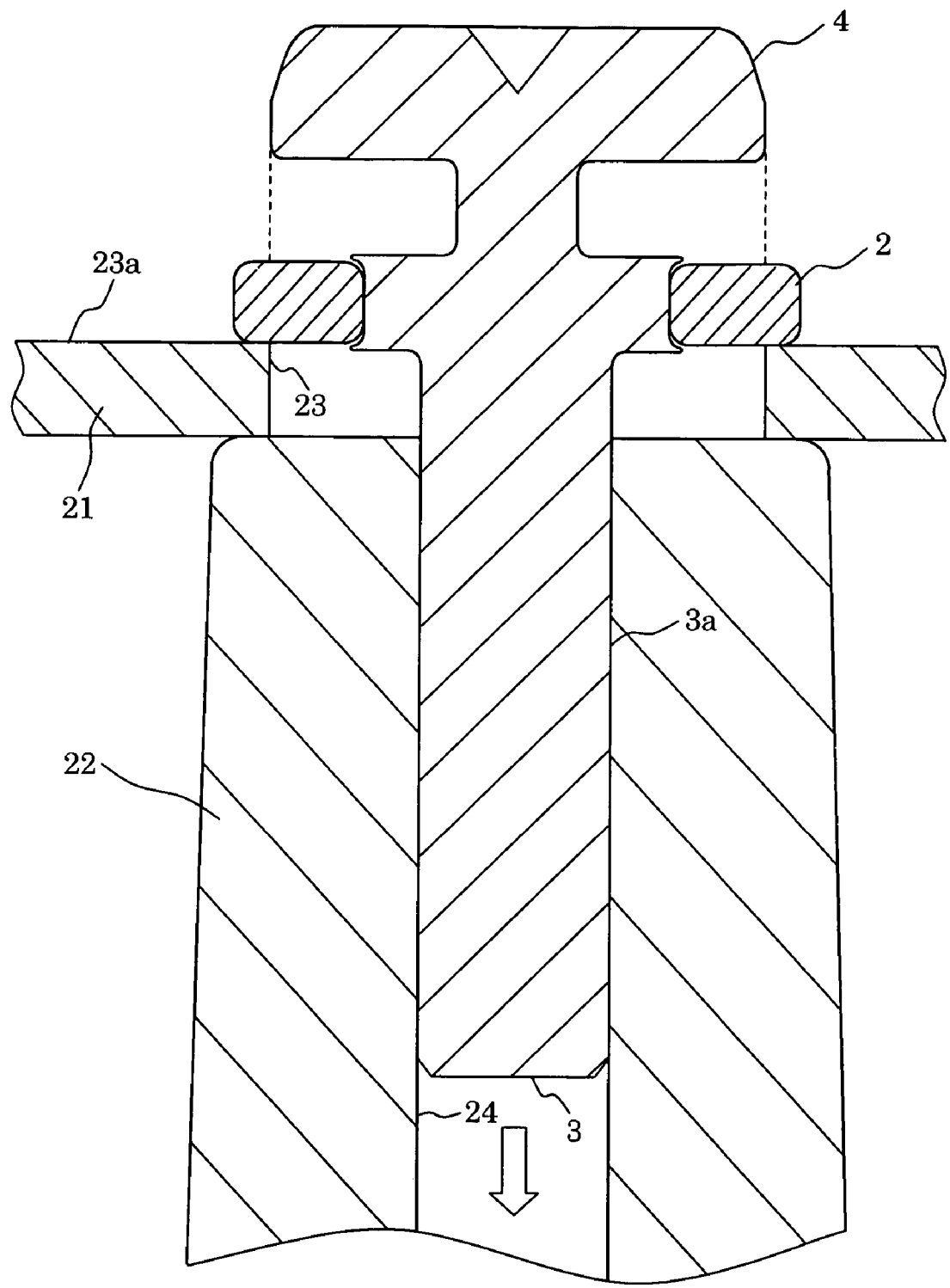
FIG. 6 is a cross-sectional view showing one example of detailed main portions in an appliance having a fastening structure including the fastening component shown in FIG. 1, and more particularly, illustrating a state where structural bodies 21 and 22 are fastened to each other via the fastening component.

FIG. 6 is a cross-sectional view showing one example of the detailed main portions in an appliance having a fastening structure including the fastening component shown in FIG. 1, and more particularly, illustrating a state where structural bodies 21 and 22 are fastened to each other via the screw 1. Examples of the appliance having a fastening structure include an air-conditioner, a washing machine, a refrigerator, a television set, a battery pack, a simple charger and the like. The present invention can be applied to the aforementioned appliances.

At the structural body 21 is formed a through hole 23 perpendicular to a seat 23a. The seat 23a herein signifies a portion in contact with the washer 2 at the time of the fastening, and further, a peripheral portion of the through hole 23 at the obverse of the structural body 21. The through hole 23 is greater in diameter than the head 4 of the screw 1. That is to say, the through hole 23 is designed to allow the screw 1 to penetrate therethrough.

Moreover, the through hole 23 is formed in diameter smaller than the outer diameter of the washer 2 during the non-contraction in such a manner as to prevent any penetration of the washer 2 before being contracted with the application of the heat. Specifically, the contact of the washer 2 with the seat 23a can inhibit the screw 1 from penetrating through the through hole 23 when the structural bodies 21 and 22 are fastened to each other, so that the washer 2 functions as a normal washer. In this embodiment, the diameter of the through hole 23 is greater than the outer diameter of the washer 2 contracted with the application of the heat, thereby enabling the washer 2 in the contracted state to penetrate through the through hole 23. In other words, if the washer 2 is heated, the screw 1 and the washer 2 can penetrate through the through hole 23.

At the structural body 22 is formed a fitting hole 24 which allows the shaft 3 of the screw 1 to be fitted thereto. The fitting hole 24 has a screw groove corresponding to the screw groove 3a at the shaft 3 and, therefore, serves as a female screw.

Next, explanation will be made on a fixing operation at the time of the fastening and an operation of the washer 2 at the time of the disassembly of the appliance.

When the screw 1 is fixed to the structural body 22 through the through hole 23 at the structural body 21, the washer 2 held in the washer holding state (i.e., position) first approaches the seat 23a in accordance with the intrusion of the tip of the shaft 3 into the fitting hole 24.

At this time, since the washer 2 is coaxially held on the circumference of the washer locker 6 of the screw 1, the washer 2 and the shaft 3 can be positioned with respect to the respective center axes of the through hole 23 and the fitting hole 24 with a remarkable ease.

When the screw 1 is fastened in the state where the washer 2 is brought into contact with the seat 23a, the washer 2 is moved toward the washer container 5 from the circumference of the washer locker 6 by the fastening force of the screw 1. When the screw 1 is further fastened in this state, the washer 2 is pressed against the seat 23*a* by the head 4, so that the structural body 21 is fixed to the structural body 22.

Figure 7:
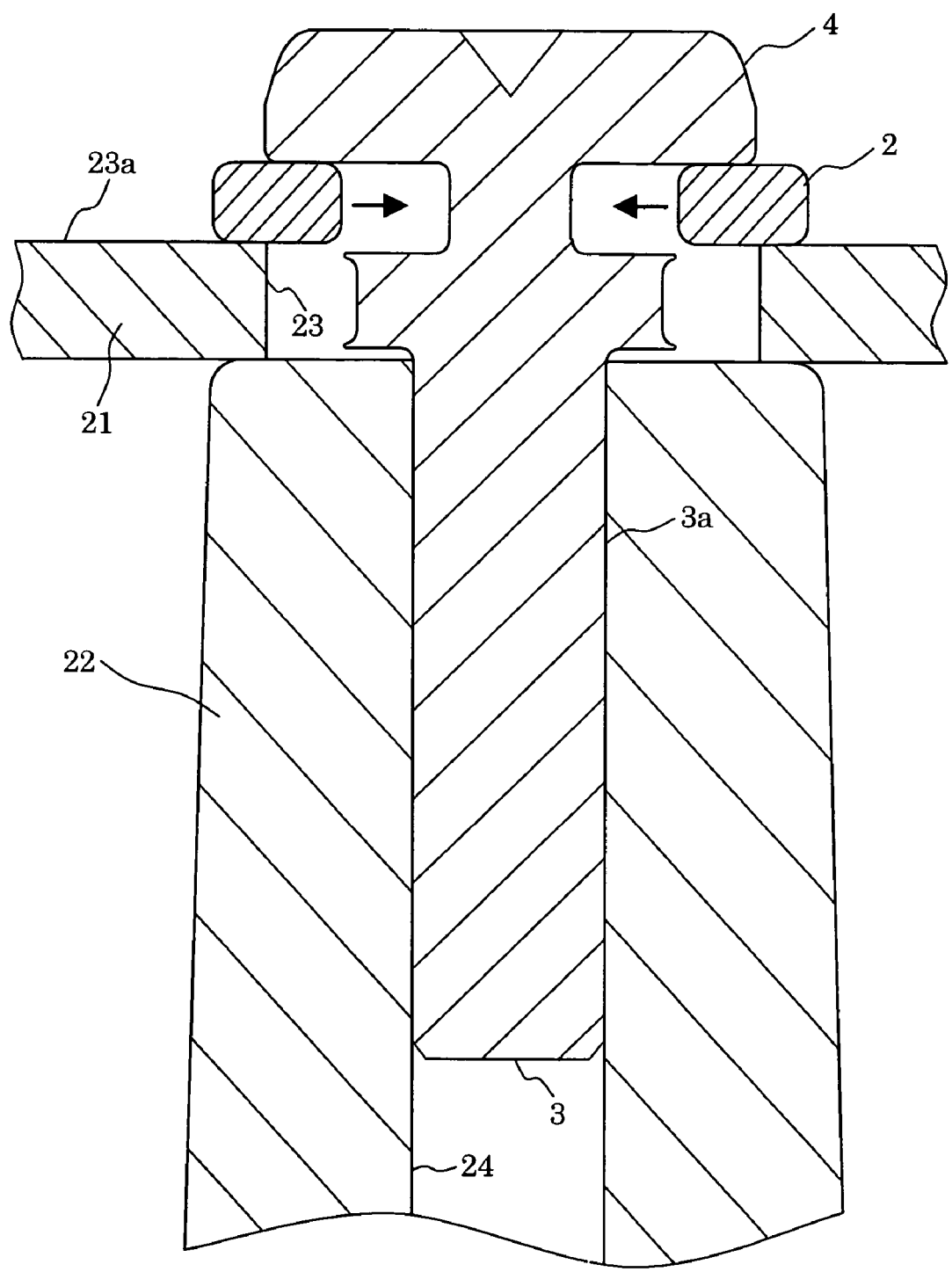
FIG. 7 is a cross-sectional view showing one example of the detailed main portions in the appliance having the fastening structure including the fastening component shown in FIG. 1, and more particularly, illustrating the operational state of the fastening component when the appliance is disassembled.

FIG. 7 is a cross-sectional view showing one example of the detailed main portions in the appliance having the fastening structure including the fastening component shown in FIG. 1, and more particularly, illustrating the operational state of the washer 2 when the appliance is disassembled. FIGS. 8A and 8B are cross-sectional views showing the detailed main portions in the appliance shown in FIG. 7; wherein FIG. 8A shows a state where the washer 2 contracted with the application of the heat is contained inside of the washer container 5, and FIG. 8B shows a state where the structural body 21 is detached from the structural body 22.

During the disassembly of the appliance, the entire appliance or the fastening structural unit including the fastening components is heated, in particular, such that the temperature of the washer 2 becomes the reverse transformation starting temperature or higher. With this heating, the washer 2 is contracted in the radial direction, and then, the washer 2 is automatically released from being pressed against the seat 23*a*. As a consequence, the structural body 21 is released from being fixed to the structural body 22, to be thus detached from the structural body 22.

In this embodiment, since the washer 2 is made of the shape-memory member contractible in the radial direction with the application of the heat, the washer 2 can be contracted in the radial direction only with the application of the heat, as necessary. At this time, the shaft 3 includes the washer container 5 for containing and holding therein the washer 2 contracted in the radial direction with the application of the heat, thereby preventing any detachment of the washer 2 contracted with the application of the heat from the shaft 3 and any scatter.

In particular, since the diameter of the through hole 23 formed at the structural body 21 is greater than the outer diameter of the washer 2 at the time of the contraction, the washer 2 contracted with the application of the heat and the screw 1 can penetrate through the through hole 23. Consequently, the structural body 21 can be readily detached from the structural body 22 only by heating the washer 2 without any detachment of the screw 1 from the structural body 22.

Incidentally, although this embodiment has been exemplified by the case where the fastening component main body is the screw 1 having the screw groove 3*a*, the present invention is not limited thereto. For example, a bolt or a rivet to be fitted to a nut may be used as the fastening component main body.

Furthermore, this embodiment has been exemplified by the case where the washer locker 6, having the diameter greater than those of other portions of the shaft 3, is formed in the shaft 3. But the present invention is not limited thereto; for example, the shaft 3 may be formed into other shapes as long as the washer 2 contracted in the radial direction with the application of the heat can be held.

Figure 9:
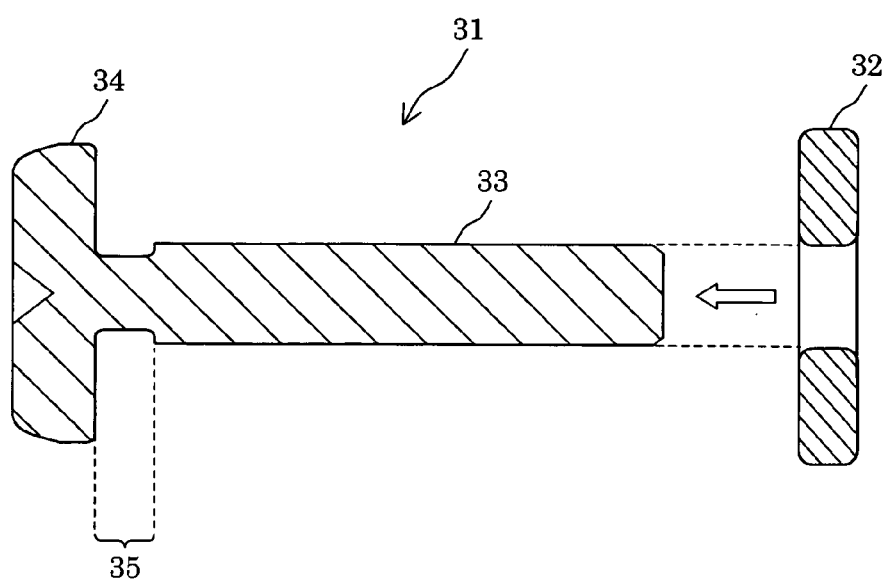
FIG. 9 is a cross-sectional view showing another example of the fastening component in the first embodiment according to the present invention.

FIG. 9 is a cross-sectional view showing another example of the fastening component in the first embodiment according to the present invention. In a screw 31, a washer container 35 is formed at an end of a head 34 in a shaft 33, wherein a diameter at the other end beyond the washer container 35 is designed to be constant. That is to say, a portion other than the washer container 35 in the shaft 33 serves as a washer locker. The diameter of the washer locker is set to be equal to an inner diameter of a washer 32. At the time of fastening, the washer 32 is located at the washer container 35; in contrast, at the time of disassembly of an appliance, the washer 32 is contained and held inside of the washer container 35 owing to contraction with the application of heat.

With the above-described configuration, the appliance can be readily disassembled only with the application of the heat without any detachment of the washer 32 from the screw 31.

Additionally, although this embodiment has been exemplified by the case where the washer 2 is held by the screw 1 at the time of the contraction with the application of the heat, the present invention is not limited thereto; for example, a screw may not hold a washer as long as a structural body can be readily detached from another structural body by the contraction of the washer with the application of the heat.

Figure 10:
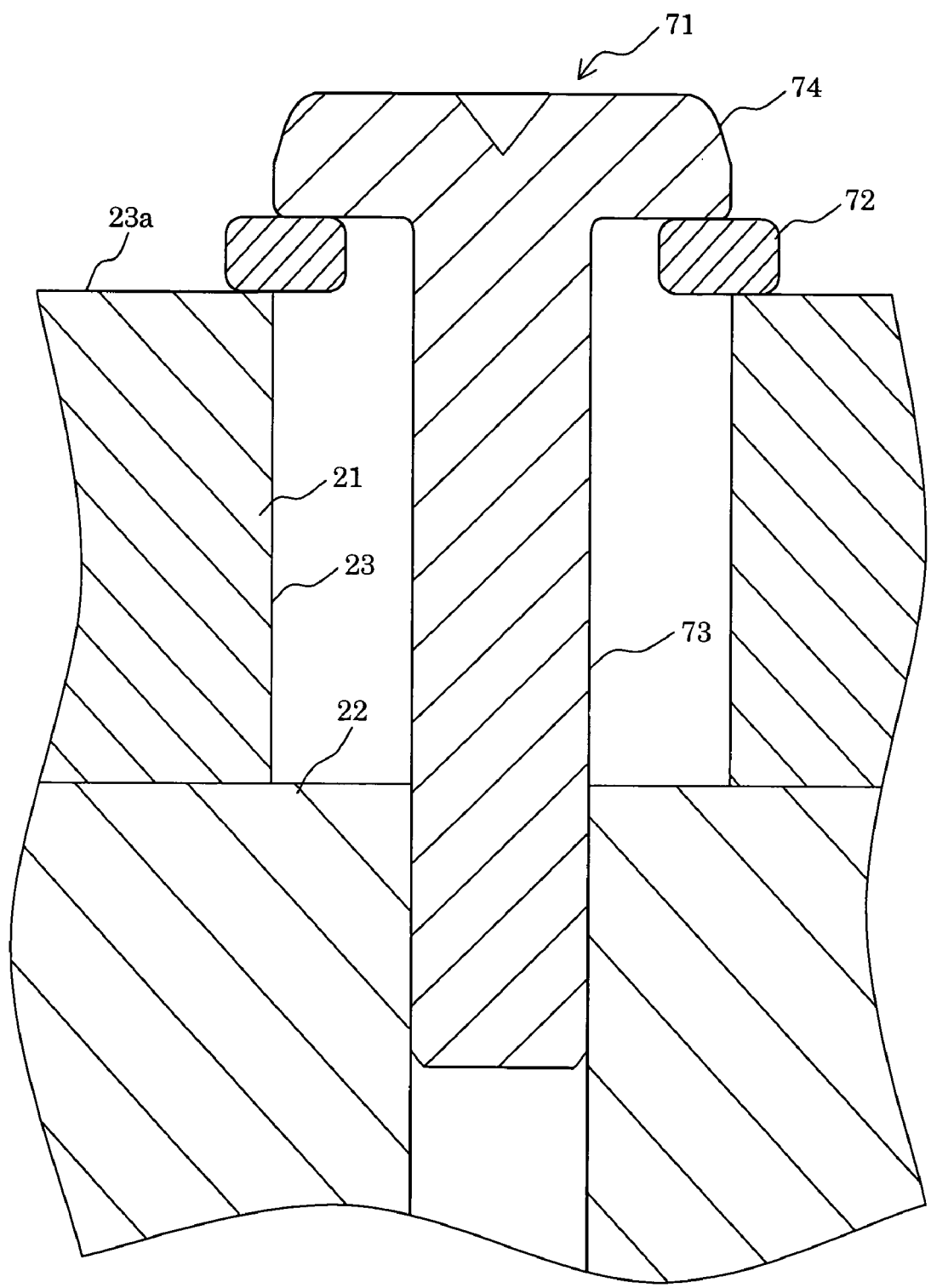
FIG. 10 is a cross-sectional view showing one example of detailed main portions in an appliance including another example of the fastening component in the first embodiment according to the present invention.

FIG. 10 is a cross-sectional view showing one example of the detailed main portions in the appliance including another example of the fastening component in the first embodiment according to the present invention. A screw 71 includes a head 74 and a shaft 73 having a constant diameter. The diameter of the shaft 73 is smaller than an inner diameter of a washer 72 during contraction, so that a panel cover 21 can be readily detached from a panel case 22 by contracting the washer 72 with the application of heat.

Second Embodiment

The first embodiment has been exemplified by the appliance in which the structural body 21 can be readily detached from the structural body 22 only by heating the washer 2 without detaching the screw 1 from the structural body 22. In the meantime, description will be given of an embodiment in which an appliance can be automatically disassembled when a washer 2 is contracted with the application of heat.

Figure 11:
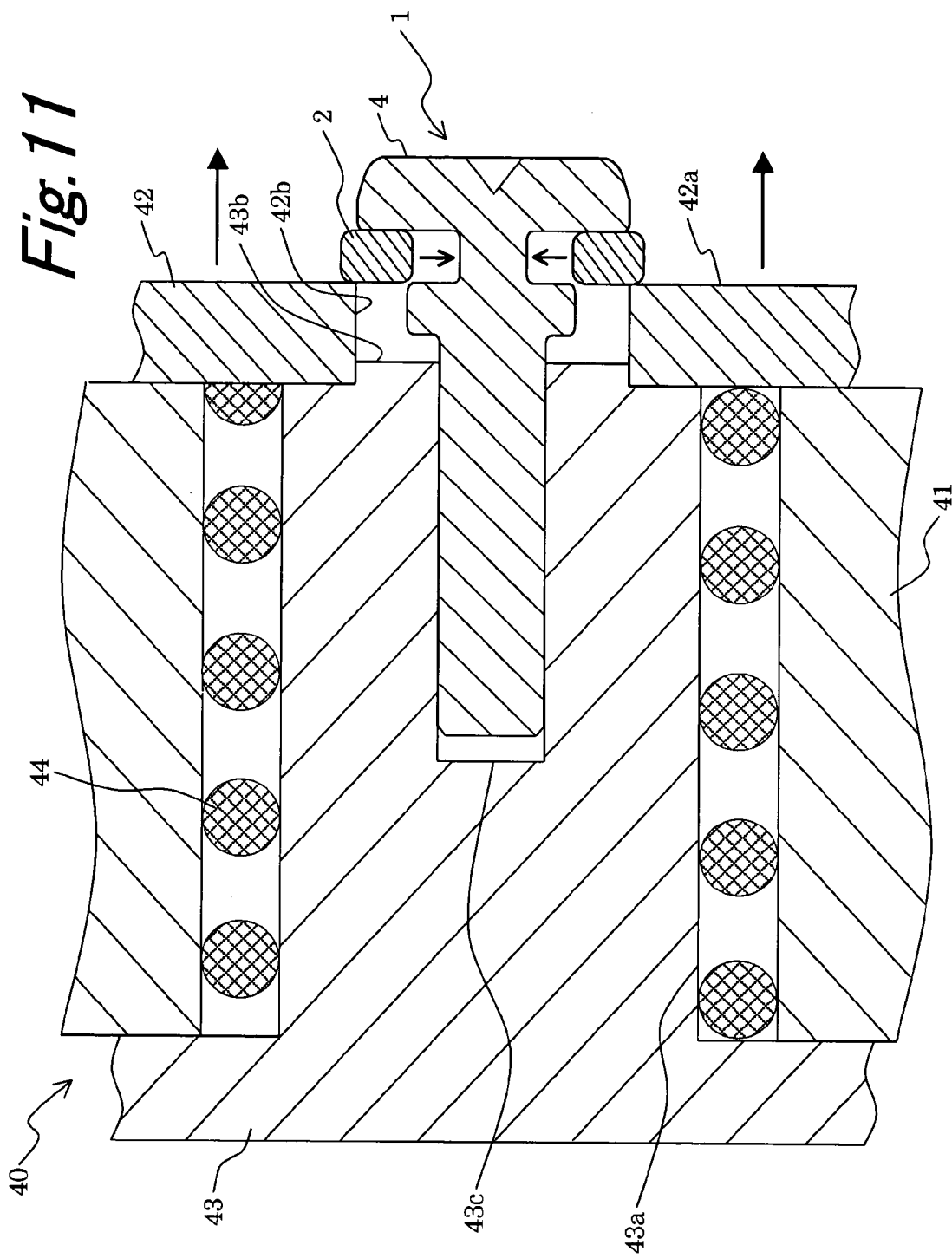
FIG. 11 is a cross-sectional view showing one example of detailed main portions in an appliance having a fastening structure in a second embodiment according to the present invention.

FIG. 11 is a cross-sectional view showing one example of detailed main portions in an appliance having a fastening structure in a second embodiment according to the present invention. This appliance 40 is a television set having a liquid crystal panel 41, in which a panel cover (i.e., first structural body) 42 constituting a plastic chassis serving as a casing and a panel case (i.e., second structural body) 43 are fastened to each other via a screw 1.

At the panel case 43 is formed a protrusion 43*a* protruding in a direction perpendicular to a panel screen. The liquid crystal panel 41 is positioned by the protrusion 43*a*. At the tip of the protrusion 43*a* is formed a fitting portion 43*b* for positioning the panel cover 42. The liquid crystal panel 41 is interposed between the panel cover 42 and the panel case 43 by fitting the fitting portion 43*b* to a through hole 42*b* formed at the panel cover 42, to be thus held in the casing.

In this state, the screw 1 and a washer 2 are fixed to the casing, and then, the tip of a shaft 3 of the screw 1 is inserted into a fitting hole 43*c* formed at the protrusion 43*a*. At the time of fastening, the washer 2 is pressed against a seat 42*a* of the panel cover 42 by a head 4, so that the panel cover 42 is fixed to the panel case 43.

In this embodiment, a coil-like spring 44 expandable along a protruding direction is disposed at the protrusion 43*a* in order to automatically detach the structural body 42 from the structural body 43 when the appliance 40 is disassembled. The spring 44 is disposed coaxially with the protrusion 43*a*, and it is contained inside of the casing in a compressed state at the time of the fastening. Specifically, in the fastened state, the panel cover 42 is urged all the time in the direction perpendicular to the panel screen by the spring 44. As a consequence, since the pressing force of the washer 2 against the seat 42a is released if the washer 2 is contracted with the application of heat during the disassembly, the panel cover 42 can be automatically detached from the panel case 43 by the resiliency of the spring 44.

With the above-described configuration, since the panel cover 42 is urged all the time, the panel cover 42 can be automatically detached from the panel case 43 only by contracting the washer 2 with the application of the heat. Thus, it is possible to further facilitate the disassembly of the appliance 40, so as to enhance operating efficiency at the time of the disassembly.

Third Embodiment

The second embodiment has been exemplified by the case where the panel cover 42 can be automatically detached from the panel case 43 with the application of the heat. In the meantime, description will be given of a fastening structure in which a fastening component can be readily detached from a panel case 43 after detachment in this embodiment.

Figure 12:
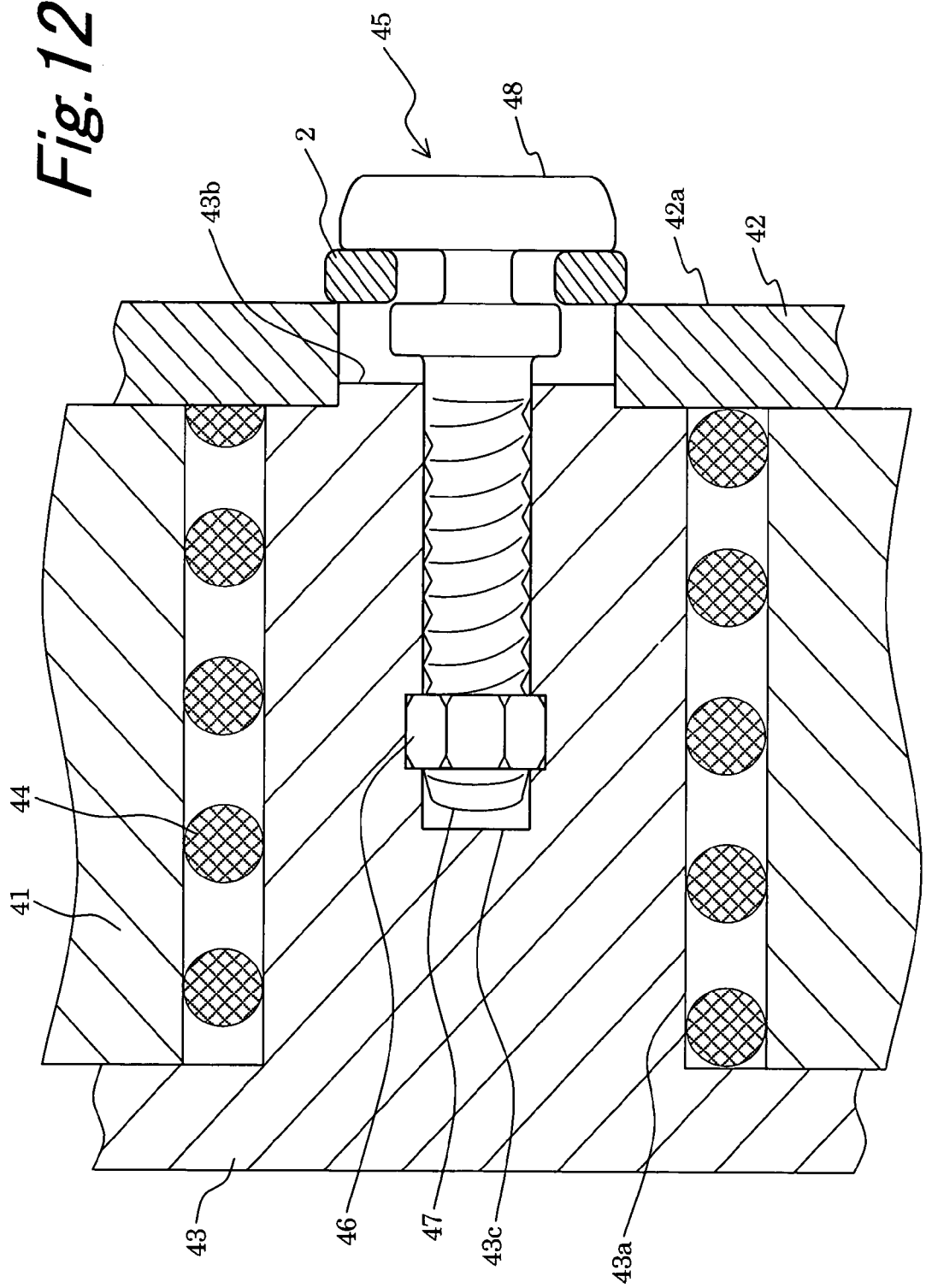
FIG. 12 is a cross-sectional view showing one example of detailed main portions in an appliance having a fastening structure in a third embodiment according to the present invention.
Figure 13:
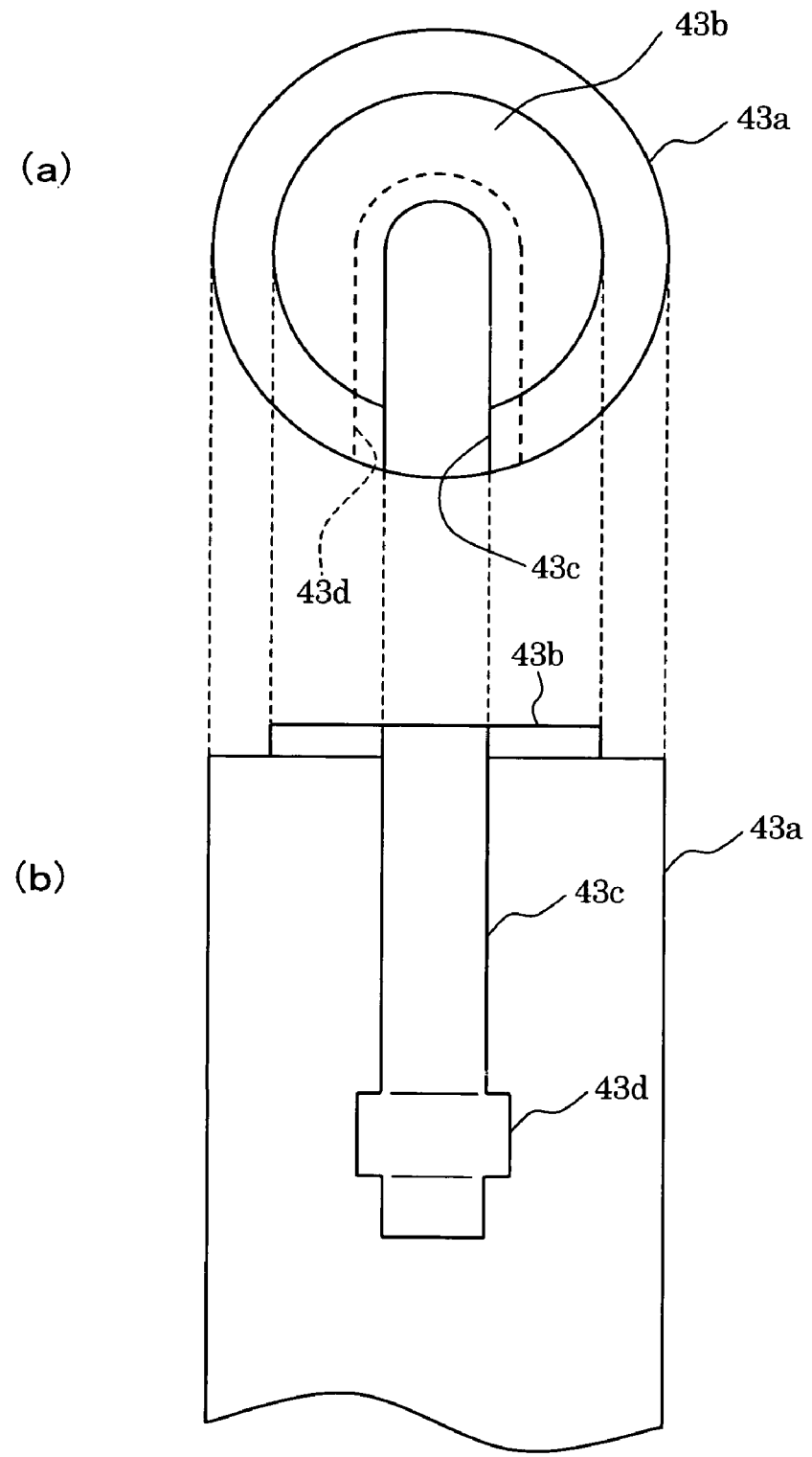
FIGS. 13A and 13B are plan views showing a protrusion formed at a panel case shown in FIG. 12.

FIG. 12 is a cross-sectional view showing one example of detailed main portions in an appliance having a fastening structure in a third embodiment according to the present invention. FIGS. 13A and 13B are plan views showing a protrusion formed at a panel case shown in FIG. 12, wherein FIG. 13A shows a state as viewed in an axial direction and FIG. 13B shows a state as viewed in a direction perpendicular to an axial direction.

In this embodiment, a bolt 45 to be fitted to a nut 46 is used as a fastening component main body. Furthermore, the configuration of the bolt 45 is the same as the screw 1 shown in FIG. 1 (in the first embodiment). A cutout parallel to an axial direction is formed at a protrusion 43a formed at the panel case 43, such that a shaft 47 of the bolt 45 slides to be freely detached from a fitting hole 43c outward of the protrusion 43a.

At the fitting hole 43c is formed a nut container 43d for containing the nut 46 therein at the time of fastening. In the state where the nut 46 is contained inside of the nut container 43d, a spring 44 and a liquid crystal panel 41 are fixed, and then, the panel case 43 and the liquid crystal panel 41 are covered with a panel cover 42, before the bolt 45 and a washer 2 are fixed to a casing. At this time, the panel cover 42 is fixed to the panel case 43 by fitting the bolt 45 to the nut 46. When the panel cover 42 is detached from the panel case 43 at the time of disassembly, the fastening force of the bolt 45 and the nut 46 is released; therefore, the bolt 45 and the nut 46 can be detached from the panel case 43 in the state of the nut 46 fitted to the bolt 45 if the bolt 45 and the nut 46 are allowed to slide in the direction perpendicular to the axial direction.

FIGS. 14A and 14B are state transition views showing one example of operation when the appliance shown in FIG. 12 is disassembled, wherein FIG. 14A shows a state where the washer 2 is contracted with the application of the heat, and FIG. 14B shows a state where the bolt 45 and the nut 46 are detached from the panel case 43 after the detachment of the panel cover 42.

In this embodiment, the bolt 45 and the nut 46 can be readily detached from the panel case 43 in the fitted state after the detachment of the panel cover 42 from the panel case 43, thereby enhancing disassembling easiness of the appliance.

Fourth Embodiment

The first embodiment has been exemplified by the case where the washer 2 can be readily positioned at the time of the fastening by coaxially holding the washer 2 on the circumference of the washer locker 6 at the time of the not-fastening. In the meantime, a description will be given of the case where a guide for guiding a washer at the time of fastening is disposed on a seat of a structural body in this embodiment.

Figure 15:
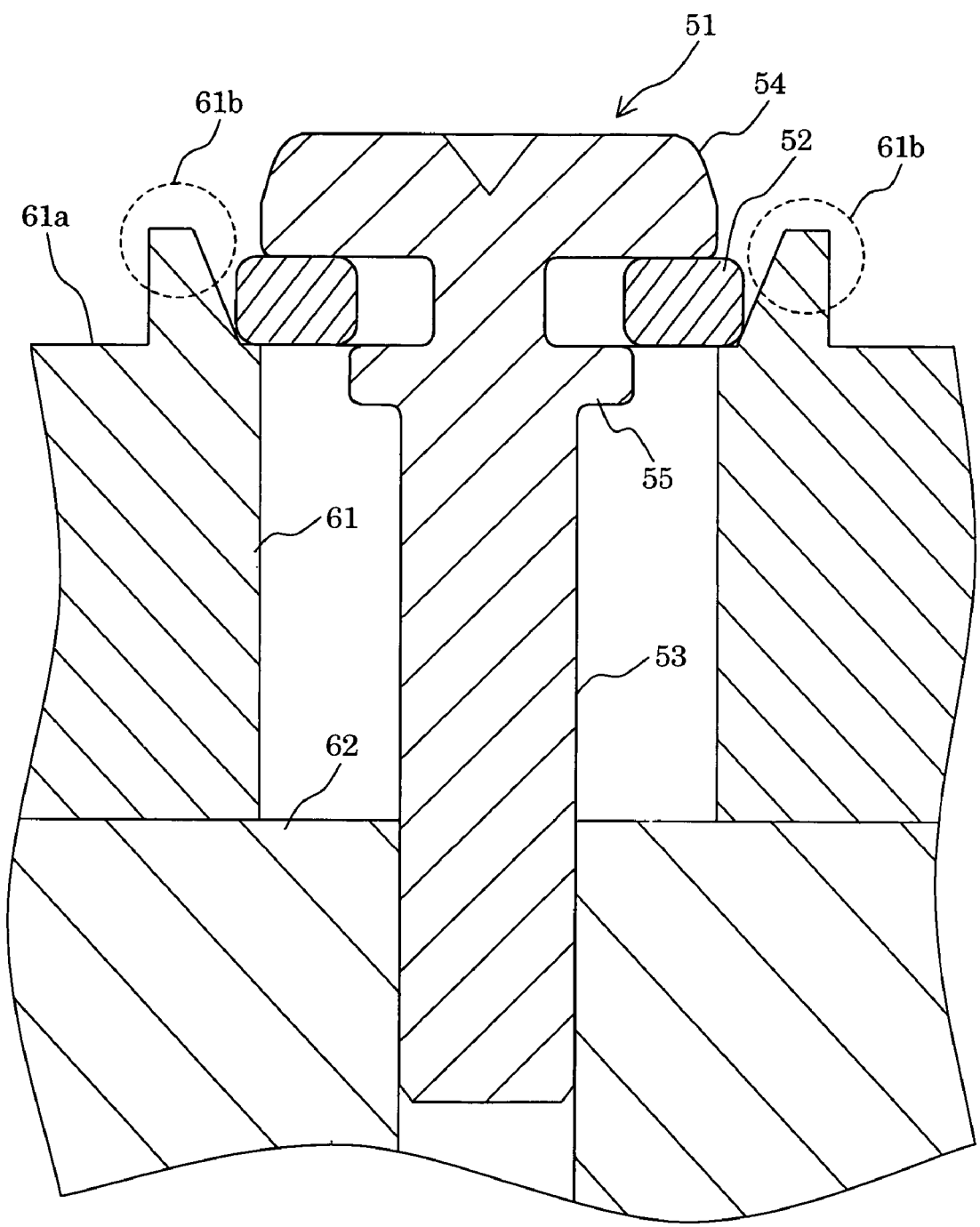
FIG. 15 is a cross-sectional view showing one example of detailed main portions in an appliance having a fastening structure in a fourth embodiment according to the present invention.

FIG. 15 is a cross-sectional view showing one example of detailed main portions in an appliance having a fastening structure in a fourth embodiment according to the present invention, illustrating the state of a washer guide 61b formed on a seat 61a of a structural body 61. The washer guide 61b projects from the seat 61a, and is adapted to guide a washer 52 when a shaft 53 is inserted into a fitting hole formed at another structural body 62, so as to fasten a screw 51 in such a manner that the center position of the washer 52 overlaps with the position of a center axis of the through hole.

For example, the washer guide 61b is formed in such a manner as to surround a through hole in a manner coaxial with the through hole, and further, the side of the through hole formed at the washer guide 61b is inclined in such a manner that a diameter becomes greater as the washer guide 61b is separated farther from the seat 61a. In other words, the washer guide 61b is formed into a bowl shape, as viewed from a fixing direction of the screw 51. Herein, it is assumed that the diameter of the washer guide 61b is greater than the outer diameter of the washer 52 at the time of the non-contraction. Incidentally, the shaft 53 includes a protrusion 55 for holding the washer 52. The protrusions 55 are formed along a circumferential direction on the circumference of the shaft 53, for holding the washer 52 at the time of the not-fastening and fastening.

In this embodiment, the washer 52 is guided by the washer guide 61b at the time of the fastening, so that the screw 51 can be prevented from being fastened in the state where the center position of the washer 52 remains deviated from the position of the center axis of the through hole.

The entire disclosure of a Japanese Patent Application No. 2004-189768 (filed on Jun. 28, 2004) including specification, claims, drawings and summary, on which the Convention priority of the present application is based, are incorporated herein by reference in its entirety.

What is claimed is:

1. A fastening component comprising:
 a head disposed at an end of a shaft and having a diameter greater than that at the end of the shaft;
 a washer holder formed around an outer circumference of the shaft, at an end portion of the shaft at which the head is disposed; and
 a washer disposed at the end portion of the shaft having the washer holder, the washer being made of a shape-memory member having an outer diameter greater than the diameter of the head and capable of being contracted in a radial direction with the application of heat into a contracted position, wherein
 the washer holder includes:
 a washer container having a diameter smaller than an inner diameter of the washer and capable of receiving the washer in the contracted position; and
 a washer locker formed adjacently to the washer container at an end of the washer container opposite to the head and having a diameter greater than the diameter of the washer container, the washer locker includes protrusions formed on the outer surface of the washer locker at an end opposite to the washer container and protruding in the radial direction from the outer circumference of the washer locker.

2. A fastening component according to claim 1, wherein the washer locker includes projections formed on the outer surface, at an end adjacent to the washer container, so as to project in the radial direction.

3. A fastening component according to claim 1, wherein the washer is formed from a spiral wire rod which stores its shape therein.

4. The fastening component according to claim 1, wherein the shaft has threads and the washer has a diameter that extends beyond the threads.

5. An appliance having a fastening structure, comprising:
a fastening component; and
first and second structural bodies, which are fastened to each other via the fastening component, wherein
the fastening component includes a shaft, a head disposed at an end of the shaft and having a diameter greater than that of the shaft, and a washer disposed at an end portion of the shaft at which the head is disposed and made of a shape-memory member having an outer diameter greater than the diameter of the head,
the first structural body includes a through hole having a diameter greater than that of the head and smaller than an outer diameter of the washer,
wherein the washer is pressed against the periphery of the through hole of the first structural body by the head thereby fixing the fastening component to the second structural body via the through hole, and
wherein the washer is capable of being contracted in a radial direction into a contracted position with the application of heat such that the outer diameter of the washer becomes less than the diameter of the through hole.

6. The appliance having a fastening structure according to claim 5, wherein
the fastening component includes a washer holder formed along a circumference of the shaft at the end portion of the shaft at which the head is disposed, capable of holding the washer in the contracted position.

7. The appliance having a fastening structure according to claim 6, wherein
the washer holder includes:
a washer container having a diameter smaller than an inner diameter of the washer in the contracted position; and
a washer locker formed adjacently to the washer container at an end that is opposite to the head and having a diameter greater than the inner diameter of the washer in the contracted position.

8. The appliance having a fastening structure according to claim 6, wherein
the first structural body includes a washer guide formed at the periphery of the through hole and adapted to guide the washer in such a manner that the center position of the washer is superimposed on a position of a center axis of the through hole at the time of the fastening.

\* \* \* \* \*